US008615619B2

(12) United States Patent
DeWitt, Jr. et al.

(10) Patent No.: US 8,615,619 B2
(45) Date of Patent: Dec. 24, 2013

(54) QUALIFYING COLLECTION OF PERFORMANCE MONITORING EVENTS BY TYPES OF INTERRUPT WHEN INTERRUPT OCCURS

(75) Inventors: Jimmie Earl DeWitt, Jr., Georgetown, TX (US); Frank Eliot Levine, Austin, TX (US); Christopher Michael Richardson, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 13/004,153

(22) Filed: Jan. 11, 2011

(65) Prior Publication Data

US 2011/0106994 A1 May 5, 2011

Related U.S. Application Data

(62) Division of application No. 10/757,186, filed on Jan. 14, 2004, now Pat. No. 7,895,382.

(51) Int. Cl.
*G06F 13/24* (2006.01)
*G06F 9/44* (2006.01)
*G01R 31/28* (2006.01)

(52) U.S. Cl.
USPC ............................ 710/266; 714/227; 717/127

(58) Field of Classification Search
USPC ................................... 712/227; 717/127–129
See application file for complete search history.

(56) References Cited

U.S. PATENT DOCUMENTS

| 2,112,794 | A | 3/1938 | Stickney |
| 3,707,725 | A | 12/1972 | Dellheim |
| 4,034,353 | A | 7/1977 | Denny et al. |
| 4,145,735 | A | 3/1979 | Soga |
| 4,291,371 | A | 9/1981 | Holtey |
| 4,316,245 | A | 2/1982 | Luu et al. |
| 4,374,409 | A | 2/1983 | Bienvenu et al. |

(Continued)

FOREIGN PATENT DOCUMENTS

| EP | 1164475 | 12/2001 |
| JP | 10083284 | 3/1998 |

(Continued)

OTHER PUBLICATIONS

Ramirez et al., "The Effect of Code Reordering on Branch Prediction", Proceedings of the International Conference on Parallel Architectures and Compilation Techniques, Oct. 2000, pp. 189-198.

(Continued)

*Primary Examiner* — Khanh Dang
(74) *Attorney, Agent, or Firm* — Yee & Associates, P.C.; David A. Mims, Jr.

(57) ABSTRACT

A method, apparatus, and computer instructions for qualifying events by types of interrupt when interrupt occurs in the processor of a data processing system. A programmable performance monitoring unit (PMU) is used to program hardware counters that collect events associated with a type of interrupt, including nested interrupts. The performance monitoring unit may also count events that occur while servicing interrupt requests based upon the state of interrupt processing. Events that are known to the performance monitoring unit such as instruction retired, TLB misses, may be counted at the same time using a number of performance monitoring counters in the performance monitoring unit.

13 Claims, 4 Drawing Sheets

(56) References Cited

U.S. PATENT DOCUMENTS

| | | | |
|---|---|---|---|
| 4,395,757 A | 7/1983 | Bienvenu et al. | |
| 4,558,413 A | 12/1985 | Schmidt et al. | |
| 4,590,555 A | 5/1986 | Bourrez | |
| 4,598,364 A | 7/1986 | Gum et al. | |
| 4,682,283 A | 7/1987 | Robb | |
| 4,794,472 A | 12/1988 | Doyama | |
| 4,821,178 A | 4/1989 | Levin et al. | |
| 4,825,359 A | 4/1989 | Ohkami et al. | |
| 4,912,623 A | 3/1990 | Rantala et al. | |
| 4,928,222 A | 5/1990 | Vriezen et al. | |
| 5,032,982 A * | 7/1991 | Dalrymple et al. | 713/501 |
| 5,051,944 A | 9/1991 | Fetterolf et al. | |
| 5,103,394 A | 4/1992 | Blasciak | |
| 5,113,507 A | 5/1992 | Jaeckel | |
| 5,142,634 A | 8/1992 | Fite et al. | |
| 5,142,635 A | 8/1992 | Saini | |
| 5,150,349 A | 9/1992 | Takai et al. | |
| 5,151,981 A | 9/1992 | Westcott et al. | |
| 5,206,584 A | 4/1993 | Nishimori | |
| 5,212,794 A | 5/1993 | Pettis et al. | |
| 5,256,775 A | 10/1993 | Froehler | |
| 5,257,358 A | 10/1993 | Cohen | |
| 5,276,833 A | 1/1994 | Auvinen et al. | |
| 5,287,481 A | 2/1994 | Lin | |
| 5,339,426 A | 8/1994 | Aoshima | |
| 5,339,435 A | 8/1994 | Lubkin et al. | |
| 5,355,487 A | 10/1994 | Keller et al. | |
| 5,394,529 A | 2/1995 | Brown, III et al. | |
| 5,404,500 A | 4/1995 | Legvold et al. | |
| 5,438,670 A | 8/1995 | Baror et al. | |
| 5,450,349 A | 9/1995 | Brown et al. | |
| 5,463,775 A | 10/1995 | DeWitt et al. | |
| 5,479,633 A | 12/1995 | Wells et al. | |
| 5,537,541 A | 7/1996 | Wibecan | |
| 5,537,572 A | 7/1996 | Michelsen et al. | |
| 5,544,342 A | 8/1996 | Dean | |
| 5,548,762 A | 8/1996 | Creedon et al. | |
| 5,555,432 A | 9/1996 | Hinton et al. | |
| 5,557,548 A | 9/1996 | Gover et al. | |
| 5,564,015 A | 10/1996 | Bunnell | |
| 5,574,872 A * | 11/1996 | Rotem et al. | 712/200 |
| 5,581,482 A | 12/1996 | Wiedenman et al. | |
| 5,581,778 A | 12/1996 | Chin et al. | |
| 5,581,981 A | 12/1996 | Fulkerson et al. | |
| 5,590,352 A | 12/1996 | Zuraski et al. | |
| 5,594,864 A | 1/1997 | Trauben | |
| 5,603,004 A | 2/1997 | Kurpanek et al. | |
| 5,628,018 A | 5/1997 | Matsuzaki et al. | |
| 5,644,692 A | 7/1997 | Eick | |
| 5,652,858 A | 7/1997 | Okada et al. | |
| 5,657,253 A | 8/1997 | Dreyer et al. | |
| 5,659,679 A | 8/1997 | Alpert et al. | |
| 5,666,507 A | 9/1997 | Flora | |
| 5,671,920 A | 9/1997 | Acquaviva et al. | |
| 5,675,802 A | 10/1997 | Allen et al. | |
| 5,684,030 A | 11/1997 | Elokdah et al. | |
| 5,689,712 A | 11/1997 | Heisch | |
| 5,691,920 A | 11/1997 | Levine et al. | |
| 5,694,540 A | 12/1997 | Humelsine et al. | |
| 5,708,803 A | 1/1998 | Ishimi et al. | |
| 5,710,881 A | 1/1998 | Gupta et al. | |
| 5,727,167 A | 3/1998 | Dwyer, III et al. | |
| 5,740,413 A | 4/1998 | Alpert et al. | |
| 5,745,770 A | 4/1998 | Thangadurai et al. | |
| 5,748,878 A | 5/1998 | Rees et al. | |
| 5,751,942 A | 5/1998 | Christensen et al. | |
| 5,752,062 A | 5/1998 | Gover et al. | |
| 5,754,839 A | 5/1998 | Pardo et al. | |
| 5,758,061 A | 5/1998 | Plum | |
| 5,758,168 A | 5/1998 | Mealey et al. | |
| 5,758,187 A | 5/1998 | Young | |
| 5,761,103 A | 6/1998 | Oakland et al. | |
| 5,768,500 A | 6/1998 | Agrawal et al. | |
| 5,772,322 A | 6/1998 | Burns et al. | |
| 5,774,724 A | 6/1998 | Heisch | |
| 5,775,825 A | 7/1998 | Hong et al. | |
| 5,787,280 A | 7/1998 | Joseph et al. | |
| 5,787,286 A | 7/1998 | Hooker | |
| 5,794,028 A | 8/1998 | Tran | |
| 5,794,052 A | 8/1998 | Harding | |
| 5,796,939 A | 8/1998 | Berc et al. | |
| 5,797,019 A | 8/1998 | Levine et al. | |
| 5,802,378 A | 9/1998 | Arndt et al. | |
| 5,802,678 A | 9/1998 | Puente | |
| 5,805,879 A | 9/1998 | Hervin et al. | |
| 5,815,707 A | 9/1998 | Krause et al. | |
| 5,822,578 A | 10/1998 | Frank et al. | |
| 5,822,763 A | 10/1998 | Baylor et al. | |
| 5,822,790 A | 10/1998 | Mehrotra | |
| 5,835,702 A | 11/1998 | Levine et al. | |
| 5,839,050 A | 11/1998 | Baehr et al. | |
| 5,855,578 A | 1/1999 | Guglielmi et al. | |
| 5,857,097 A | 1/1999 | Henzinger et al. | |
| 5,862,381 A | 1/1999 | Advani et al. | |
| 5,872,913 A | 2/1999 | Berry et al. | |
| 5,875,294 A | 2/1999 | Roth et al. | |
| 5,875,334 A | 2/1999 | Chow et al. | |
| 5,887,159 A | 3/1999 | Burrows | |
| 5,889,947 A | 3/1999 | Starke | |
| 5,896,538 A | 4/1999 | Blandy et al. | |
| 5,909,573 A | 6/1999 | Sheaffer | |
| 5,913,925 A | 6/1999 | Kahle et al. | |
| 5,920,689 A | 7/1999 | Berry et al. | |
| 5,920,721 A | 7/1999 | Hunter et al. | |
| 5,923,863 A | 7/1999 | Adler et al. | |
| 5,926,640 A | 7/1999 | Mason et al. | |
| 5,928,334 A | 7/1999 | Mandyam et al. | |
| 5,930,508 A | 7/1999 | Faraboschi et al. | |
| 5,937,437 A | 8/1999 | Roth et al. | |
| 5,938,760 A | 8/1999 | Levine et al. | |
| 5,938,778 A | 8/1999 | John, Jr. et al. | |
| 5,940,618 A | 8/1999 | Blandy et al. | |
| 5,949,971 A | 9/1999 | Levine et al. | |
| 5,950,003 A | 9/1999 | Kaneshiro et al. | |
| 5,950,009 A | 9/1999 | Bortnikov et al. | |
| 5,966,537 A | 10/1999 | Ravichandran | |
| 5,966,538 A | 10/1999 | Granston et al. | |
| 5,966,539 A | 10/1999 | Srivastava | |
| 5,970,439 A | 10/1999 | Levine et al. | |
| 5,973,417 A | 10/1999 | Goetz et al. | |
| 5,973,542 A | 10/1999 | Okayasu et al. | |
| 5,978,907 A | 11/1999 | Tran et al. | |
| 5,987,250 A | 11/1999 | Subrahmanyam | |
| 5,987,598 A | 11/1999 | Levine et al. | |
| 5,991,708 A | 11/1999 | Levine et al. | |
| 5,991,908 A | 11/1999 | Baxter et al. | |
| 5,996,069 A | 11/1999 | Yasoshima et al. | |
| 6,006,033 A | 12/1999 | Heisch | |
| 6,009,514 A | 12/1999 | Henzinger et al. | |
| 6,026,235 A | 2/2000 | Shaughnessy | |
| 6,063,134 A | 5/2000 | Peters et al. | |
| 6,067,644 A | 5/2000 | Levine et al. | |
| 6,070,009 A | 5/2000 | Dean et al. | |
| 6,073,109 A | 6/2000 | Flores et al. | |
| 6,073,215 A | 6/2000 | Snyder | |
| 6,094,709 A | 7/2000 | Baylor et al. | |
| 6,098,169 A | 8/2000 | Ranganathan | |
| 6,101,524 A | 8/2000 | Choi et al. | |
| 6,105,051 A | 8/2000 | Borkenhagen et al. | |
| 6,105,129 A | 8/2000 | Meier et al. | |
| 6,112,317 A | 8/2000 | Berc et al. | |
| 6,118,448 A | 9/2000 | McMillan et al. | |
| 6,119,075 A | 9/2000 | Dean et al. | |
| 6,134,676 A | 10/2000 | VanHuben et al. | |
| 6,145,077 A | 11/2000 | Sidwell et al. | |
| 6,145,123 A | 11/2000 | Torrey et al. | |
| 6,147,318 A | 11/2000 | Marhic | |
| 6,148,321 A | 11/2000 | Hammond | |
| 6,149,318 A | 11/2000 | Chase et al. | |
| 6,161,187 A | 12/2000 | Mason et al. | |
| 6,163,840 A | 12/2000 | Chrysos et al. | |
| 6,182,210 B1 | 1/2001 | Akkary et al. | |
| 6,185,652 B1 | 2/2001 | Shek et al. | |
| 6,185,671 B1 | 2/2001 | Pentovski et al. | |

(56) References Cited

U.S. PATENT DOCUMENTS

| | | |
|---|---|---|
| 6,189,072 B1 | 2/2001 | Levine et al. |
| 6,189,141 B1 | 2/2001 | Benitez et al. |
| 6,189,142 B1 | 2/2001 | Johnston et al. |
| 6,192,513 B1 | 2/2001 | Subrahmanyam |
| 6,195,765 B1 | 2/2001 | Kislanko et al. |
| 6,199,204 B1 | 3/2001 | Donohue |
| 6,202,199 B1 | 3/2001 | Wygodny et al. |
| 6,202,207 B1 | 3/2001 | Donohue |
| 6,206,235 B1 | 3/2001 | Green |
| 6,206,584 B1 | 3/2001 | Hastings |
| 6,212,675 B1 | 4/2001 | Johnston et al. |
| 6,223,338 B1 | 4/2001 | Smolders |
| 6,233,679 B1 | 5/2001 | Holmberg |
| 6,237,019 B1 | 5/2001 | Ault et al. |
| 6,237,141 B1 | 5/2001 | Holzle et al. |
| 6,240,510 B1 | 5/2001 | Yeh et al. |
| 6,243,804 B1 | 6/2001 | Cheng |
| 6,247,113 B1 | 6/2001 | Jaggar |
| 6,253,338 B1 | 6/2001 | Smolders |
| 6,256,771 B1 | 7/2001 | O'Neil et al. |
| 6,256,775 B1 | 7/2001 | Flynn |
| 6,275,893 B1 | 8/2001 | Bonola |
| 6,278,064 B1 | 8/2001 | Hinkley et al. |
| 6,285,974 B1 | 9/2001 | Mandyam et al. |
| 6,286,132 B1 | 9/2001 | Tanaka et al. |
| 6,286,584 B1 | 9/2001 | Frields |
| 6,298,521 B1 | 10/2001 | Butterfield |
| 6,311,327 B1 | 10/2001 | O'Brien et al. |
| 6,324,689 B1 | 11/2001 | Lowney et al. |
| 6,330,662 B1 | 12/2001 | Patel et al. |
| 6,339,818 B1 | 1/2002 | Olszewski et al. |
| 6,349,406 B1 | 2/2002 | Levine et al. |
| 6,351,844 B1 | 2/2002 | Bala |
| 6,353,877 B1 * | 3/2002 | Duncan et al. ................ 711/155 |
| 6,374,364 B1 | 4/2002 | McElroy et al. |
| 6,378,064 B1 | 4/2002 | Edwards et al. |
| 6,381,679 B1 | 4/2002 | Matsubara et al. |
| 6,404,500 B1 | 6/2002 | Schneider et al. |
| 6,406,135 B1 | 6/2002 | Watanabe et al. |
| 6,408,386 B1 | 6/2002 | Hammond et al. |
| 6,425,118 B1 | 7/2002 | Molloy et al. |
| 6,430,741 B1 | 8/2002 | Mattson, Jr. et al. |
| 6,430,938 B1 | 8/2002 | Royal et al. |
| 6,438,743 B1 | 8/2002 | Boehm et al. |
| 6,442,585 B1 | 8/2002 | Dean et al. |
| 6,446,019 B1 | 9/2002 | Kynett et al. |
| 6,446,029 B1 | 9/2002 | Davidson et al. |
| 6,453,468 B1 | 9/2002 | D'Souza |
| 6,457,170 B1 | 9/2002 | Boehm et al. |
| 6,459,998 B1 | 10/2002 | Hoffman |
| 6,460,135 B1 | 10/2002 | Suganuma |
| 6,460,693 B1 | 10/2002 | Harrold |
| 6,477,703 B1 | 11/2002 | Smith et al. |
| 6,480,938 B2 | 11/2002 | Vondran, Jr. |
| 6,480,966 B1 | 11/2002 | Rawson, III |
| 6,484,315 B1 | 11/2002 | Ziese |
| 6,501,995 B1 | 12/2002 | Kinney et al. |
| 6,505,292 B1 | 1/2003 | Witt |
| 6,513,045 B1 | 1/2003 | Casey et al. |
| 6,519,310 B2 | 2/2003 | Chapple |
| 6,526,571 B1 | 2/2003 | Aizikowitz et al. |
| 6,530,042 B1 | 3/2003 | Davidson et al. |
| 6,539,458 B2 | 3/2003 | Holmberg |
| 6,542,985 B1 | 4/2003 | Johnson et al. |
| 6,549,930 B1 | 4/2003 | Chrysos et al. |
| 6,549,959 B1 | 4/2003 | Yates et al. |
| 6,549,998 B1 | 4/2003 | Pekarich et al. |
| 6,550,002 B1 | 4/2003 | Davidson et al. |
| 6,559,959 B2 | 5/2003 | Miura et al. |
| 6,560,693 B1 | 5/2003 | Puzak et al. |
| 6,562,858 B2 | 5/2003 | Oxenkrug |
| 6,569,679 B1 | 5/2003 | Barber et al. |
| 6,574,727 B1 | 6/2003 | Davidson et al. |
| 6,594,820 B1 | 7/2003 | Ungar |
| 6,598,153 B1 | 7/2003 | Flachs et al. |
| 6,601,233 B1 | 7/2003 | Underwood |
| 6,631,514 B1 | 10/2003 | Le |
| 6,636,950 B1 | 10/2003 | Mithal et al. |
| 6,647,301 B1 | 11/2003 | Sederlund et al. |
| 6,654,781 B1 | 11/2003 | Browning |
| 6,658,416 B1 | 12/2003 | Hussain et al. |
| 6,658,651 B2 | 12/2003 | O'Brien et al. |
| 6,662,295 B2 | 12/2003 | Yamaura |
| 6,665,776 B2 | 12/2003 | Jouppi et al. |
| 6,678,755 B1 | 1/2004 | Peterson et al. |
| 6,681,387 B1 | 1/2004 | Hwu et al. |
| 6,681,388 B1 | 1/2004 | Sato et al. |
| 6,687,794 B2 | 2/2004 | Malik |
| 6,687,807 B1 | 2/2004 | Damron |
| 6,687,811 B1 | 2/2004 | Yamada |
| 6,708,296 B1 | 3/2004 | Gover et al. |
| 6,721,875 B1 | 4/2004 | McCormick et al. |
| 6,725,457 B1 | 4/2004 | Priem et al. |
| 6,725,458 B2 | 4/2004 | Shimotani et al. |
| 6,732,354 B2 | 5/2004 | Ebeling et al. |
| 6,735,666 B1 | 5/2004 | Koning |
| 6,735,757 B1 | 5/2004 | Kroening et al. |
| 6,742,179 B2 | 5/2004 | Megiddo et al. |
| 6,757,771 B2 | 6/2004 | Christie |
| 6,758,168 B2 | 7/2004 | Koskinen et al. |
| 6,772,322 B1 * | 8/2004 | Merchant et al. ............. 712/227 |
| 6,772,412 B2 | 8/2004 | Baba et al. |
| 6,774,724 B2 | 8/2004 | Krvavac |
| 6,775,728 B2 | 8/2004 | Zimmer et al. |
| 6,775,825 B1 | 8/2004 | Grumann et al. |
| 6,782,454 B1 | 8/2004 | Damron |
| 6,785,844 B2 | 8/2004 | Wong et al. |
| 6,801,961 B2 | 10/2004 | Chu et al. |
| 6,820,155 B1 | 11/2004 | Ito |
| 6,832,296 B2 | 12/2004 | Hooker |
| 6,840,829 B2 | 1/2005 | Matsuda et al. |
| 6,842,850 B2 | 1/2005 | Ganapathy et al. |
| 6,848,029 B2 | 1/2005 | Coldewey |
| 6,848,030 B2 | 1/2005 | Tokar et al. |
| 6,857,083 B2 | 2/2005 | Floyd et al. |
| 6,865,663 B2 | 3/2005 | Barry |
| 6,865,666 B2 | 3/2005 | Yoshida et al. |
| 6,871,298 B1 | 3/2005 | Cavanaugh et al. |
| 6,918,106 B1 | 7/2005 | Burridge et al. |
| 6,918,606 B2 | 7/2005 | Petrishe |
| 6,925,424 B2 | 8/2005 | Jones et al. |
| 6,928,521 B1 | 8/2005 | Burton et al. |
| 6,928,582 B2 | 8/2005 | Adl-Tabatabai et al. |
| 6,930,508 B2 | 8/2005 | Kim et al. |
| 6,944,720 B2 | 9/2005 | Sperber et al. |
| 6,944,722 B2 | 9/2005 | Cantrill |
| 6,944,734 B2 | 9/2005 | Anzai et al. |
| 6,948,032 B2 | 9/2005 | Kadambi et al. |
| 6,948,059 B1 | 9/2005 | Sprecher et al. |
| 6,951,018 B2 | 9/2005 | Long et al. |
| 6,961,681 B1 | 11/2005 | Choquier et al. |
| 6,961,925 B2 | 11/2005 | Callahan, II et al. |
| 6,966,057 B2 | 11/2005 | Lueh |
| 6,970,999 B2 | 11/2005 | Kurihara et al. |
| 6,971,091 B1 | 11/2005 | Arnold et al. |
| 6,972,417 B2 | 12/2005 | Suganuma et al. |
| 6,972,541 B2 | 12/2005 | Matsushiro et al. |
| 6,973,417 B1 | 12/2005 | Maxwell et al. |
| 6,973,542 B1 | 12/2005 | Schmuck et al. |
| 6,981,128 B2 | 12/2005 | Fluhr et al. |
| 6,988,186 B2 | 1/2006 | Eickemeyer et al. |
| 7,020,808 B2 | 3/2006 | Sato et al. |
| 7,024,668 B2 | 4/2006 | Shiomi et al. |
| 7,035,996 B2 | 4/2006 | Woodall et al. |
| 7,065,634 B2 | 6/2006 | Lewis et al. |
| 7,069,541 B2 | 6/2006 | Dougherty et al. |
| 7,089,535 B2 | 8/2006 | Bates et al. |
| 7,093,081 B2 | 8/2006 | DeWitt, Jr. et al. |
| 7,093,154 B2 | 8/2006 | Bartfai et al. |
| 7,093,236 B2 | 8/2006 | Swaine et al. |
| 7,114,036 B2 | 9/2006 | DeWitt, Jr. et al. |
| 7,114,150 B2 | 9/2006 | Dimpsey et al. |
| 7,131,115 B2 | 10/2006 | Hundt et al. |
| 7,155,575 B2 | 12/2006 | Krishnaiyer et al. |

(56) References Cited

U.S. PATENT DOCUMENTS

| | | |
|---|---|---|
| 7,162,594 B2 | 1/2007 | Bungo |
| 7,168,067 B2 | 1/2007 | Betker et al. |
| 7,181,723 B2 | 2/2007 | Luk et al. |
| 7,194,732 B2 | 3/2007 | Fisher et al. |
| 7,197,586 B2 | 3/2007 | DeWitt, Jr. et al. |
| 7,207,043 B2 | 4/2007 | Blythe et al. |
| 7,210,126 B2 | 4/2007 | Ghobrial et al. |
| 7,225,309 B2 | 5/2007 | DeWitt, Jr. et al. |
| 7,237,242 B2 | 6/2007 | Blythe et al. |
| 7,257,657 B2 | 8/2007 | DeWitt, Jr. et al. |
| 7,290,254 B2 | 10/2007 | Comp et al. |
| 7,293,164 B2 | 11/2007 | DeWitt, Jr. et al. |
| 7,296,130 B2 | 11/2007 | Dimpsey et al. |
| 7,296,259 B2 | 11/2007 | Betker et al. |
| 7,299,319 B2 | 11/2007 | Dimpsey et al. |
| 7,313,655 B2 | 12/2007 | Hsu |
| 7,373,637 B2 | 5/2008 | DeWitt, Jr. et al. |
| 7,392,370 B2 | 6/2008 | DeWitt, Jr. et al. |
| 7,395,527 B2 | 7/2008 | DeWitt, Jr. et al. |
| 7,415,699 B2 | 8/2008 | Gouriou et al. |
| 7,415,705 B2 | 8/2008 | DeWitt, Jr. et al. |
| 7,421,681 B2 | 9/2008 | DeWitt, Jr. et al. |
| 7,421,684 B2 | 9/2008 | Dimpsey et al. |
| 7,448,025 B2 | 11/2008 | Kalafatis et al. |
| 7,458,078 B2 | 11/2008 | DeWitt, Jr. et al. |
| 7,469,407 B2 | 12/2008 | Burky et al. |
| 7,480,899 B2 | 1/2009 | Dimpsey et al. |
| 7,487,301 B2 | 2/2009 | Mutz et al. |
| 7,496,908 B2 | 2/2009 | DeWitt, Jr. et al. |
| 7,496,909 B2 | 2/2009 | Kuch et al. |
| 7,526,616 B2 | 4/2009 | Dimpsey et al. |
| 7,526,757 B2 | 4/2009 | Levine et al. |
| 7,574,587 B2 | 8/2009 | DeWitt, Jr. et al. |
| 7,577,951 B2 | 8/2009 | Partamian et al. |
| 7,581,218 B2 | 8/2009 | Johnson |
| 7,594,219 B2 | 9/2009 | Ramachandran et al. |
| 7,620,777 B2 | 11/2009 | Dimpsey et al. |
| 7,779,394 B2 | 8/2010 | Homing et al. |
| 7,783,886 B2 | 8/2010 | Walmsley |
| 7,895,382 B2 | 2/2011 | DeWitt, Jr. et al. |
| 7,895,473 B2 | 2/2011 | Alexander, III et al. |
| 7,902,986 B2 | 3/2011 | Takei |
| 7,926,041 B2 | 4/2011 | Dimpsey et al. |
| 7,937,685 B2 | 5/2011 | Weil et al. |
| 7,937,691 B2 | 5/2011 | Dewitt, Jr. et al. |
| 7,987,453 B2 | 7/2011 | Dewitt, Jr. et al. |
| 8,042,102 B2 | 10/2011 | Dewitt, Jr. et al. |
| 8,070,009 B2 | 12/2011 | Mckenzie et al. |
| 8,135,915 B2 | 3/2012 | Dimpsey et al. |
| 8,141,099 B2 | 3/2012 | Dewitt, Jr. et al. |
| 8,171,457 B2 | 5/2012 | Dimpsey et al. |
| 8,191,049 B2 | 5/2012 | Levine et al. |
| 8,255,880 B2 | 8/2012 | Dewitt, Jr. et al. |
| 2001/0014905 A1 | 8/2001 | Onodera |
| 2001/0032305 A1 | 10/2001 | Barry |
| 2002/0019976 A1 | 2/2002 | Patel et al. |
| 2002/0073406 A1 | 6/2002 | Gove |
| 2002/0124161 A1 | 9/2002 | Moyer et al. |
| 2002/0124237 A1 | 9/2002 | Sprunt et al. |
| 2002/0129309 A1 | 9/2002 | Floyd et al. |
| 2002/0147965 A1 | 10/2002 | Swaine et al. |
| 2002/0157086 A1 | 10/2002 | Lewis et al. |
| 2002/0199179 A1 | 12/2002 | Lavery et al. |
| 2003/0005422 A1 | 1/2003 | Kosche et al. |
| 2003/0014741 A1 | 1/2003 | Megiddo et al. |
| 2003/0040955 A1 | 2/2003 | Anaya et al. |
| 2003/0041096 A1 | 2/2003 | Johnson |
| 2003/0061471 A1 | 3/2003 | Matsuo |
| 2003/0066055 A1 | 4/2003 | Spivey |
| 2003/0101367 A1 | 5/2003 | Bartfai et al. |
| 2003/0115580 A1 | 6/2003 | Aria et al. |
| 2003/0126590 A1 | 7/2003 | Burrows et al. |
| 2003/0131343 A1 | 7/2003 | French et al. |
| 2003/0135719 A1 | 7/2003 | DeWitt, Jr. et al. |
| 2003/0135720 A1 | 7/2003 | DeWitt et al. |
| 2003/0154463 A1 | 8/2003 | Betker et al. |
| 2003/0191900 A1 | 10/2003 | Hooker |
| 2003/0225917 A1 | 12/2003 | Partamian et al. |
| 2004/0003381 A1 | 1/2004 | Suzuki et al. |
| 2004/0006546 A1 | 1/2004 | Wedlake et al. |
| 2004/0030870 A1 | 2/2004 | Buser |
| 2004/0049712 A1 | 3/2004 | Betker et al. |
| 2004/0128651 A1 | 7/2004 | Lau |
| 2004/0153612 A1 | 8/2004 | Mutz et al. |
| 2004/0194076 A1 | 9/2004 | Comp et al. |
| 2004/0205302 A1 | 10/2004 | Cantrill |
| 2004/0268316 A1 | 12/2004 | Fisher et al. |
| 2005/0071515 A1 | 3/2005 | DeWitt, Jr. et al. |
| 2005/0071516 A1 | 3/2005 | Levine et al. |
| 2005/0071608 A1 | 3/2005 | DeWitt, Jr. et al. |
| 2005/0071609 A1 | 3/2005 | Levine et al. |
| 2005/0071610 A1 | 3/2005 | Levine et al. |
| 2005/0071611 A1 | 3/2005 | DeWitt, Jr. et al. |
| 2005/0071612 A1 | 3/2005 | DeWitt, Jr. et al. |
| 2005/0071816 A1 | 3/2005 | Levine et al. |
| 2005/0071817 A1 | 3/2005 | DeWitt, Jr. et al. |
| 2005/0071821 A1 | 3/2005 | Levine et al. |
| 2005/0071822 A1 | 3/2005 | DeWitt, Jr. et al. |
| 2005/0081019 A1 | 4/2005 | DeWitt, Jr. et al. |
| 2005/0081107 A1 | 4/2005 | DeWitt, Jr. et al. |
| 2005/0091456 A1 | 4/2005 | Huck |
| 2005/0102493 A1 | 5/2005 | DeWitt, Jr. et al. |
| 2005/0108483 A1 | 5/2005 | Bungo |
| 2005/0154811 A1 | 7/2005 | DeWitt, Jr. et al. |
| 2005/0154812 A1 | 7/2005 | DeWitt, Jr. et al. |
| 2005/0154813 A1 | 7/2005 | DeWitt, Jr. et al. |
| 2005/0154838 A1 | 7/2005 | DeWitt, Jr. et al. |
| 2005/0154839 A1 | 7/2005 | DeWitt, Jr. et al. |
| 2005/0154867 A1 | 7/2005 | DeWitt, Jr. et al. |
| 2005/0155018 A1 | 7/2005 | DeWitt, Jr. et al. |
| 2005/0155019 A1 | 7/2005 | Levine et al. |
| 2005/0155020 A1 | 7/2005 | DeWitt, Jr. et al. |
| 2005/0155021 A1 | 7/2005 | DeWitt, Jr. et al. |
| 2005/0155022 A1 | 7/2005 | DeWitt, Jr. et al. |
| 2005/0155025 A1 | 7/2005 | DeWitt, Jr. et al. |
| 2005/0155026 A1 | 7/2005 | DeWitt, Jr. et al. |
| 2005/0155030 A1 | 7/2005 | DeWitt, Jr. et al. |
| 2005/0177822 A1 | 8/2005 | Kuch et al. |
| 2005/0210275 A1 | 9/2005 | Homing et al. |
| 2005/0210450 A1 | 9/2005 | Dimpsey et al. |
| 2005/0257092 A1 | 11/2005 | Alexander et al. |
| 2006/0090063 A1 | 4/2006 | Theis |
| 2008/0088609 A1 | 4/2008 | Chou et al. |
| 2008/0141005 A1 | 6/2008 | Dewitt, Jr. et al. |
| 2008/0235495 A1 | 9/2008 | DeWitt et al. |
| 2009/0287729 A1 | 11/2009 | Chen et al. |
| 2009/0300587 A1 | 12/2009 | Zheng et al. |
| 2011/0105970 A1 | 5/2011 | Gainer, Jr. |
| 2012/0151465 A1 | 6/2012 | Dewitt, Jr. et al. |

FOREIGN PATENT DOCUMENTS

| | | |
|---|---|---|
| JP | 10260820 | 9/1998 |
| JP | 2000029731 | 12/1999 |
| JP | 2000347863 | 12/2000 |
| TW | 406239 | 9/2000 |
| TW | 457432 | 10/2001 |

OTHER PUBLICATIONS

Yang et al., "Improving Performance by Branch Reordering", Proceedings of the ACM SIGPLAN 1998 Conference onProgramming Language Design and Implementation, Montreal Canada, 1008, pp. 130-141.

Conte et al., "Accurate and Practical Profile-Driven Compilation Using the Profile Buffer", Proceedings of the 29th Annual ACM/IEEE International Symposium on Microarchitecture, Paris, France, 1996, pp. 36-45.

Conte et al., "Using Branch Handling Hardware to Support Profile-Driven Optimization", Proceedings of the 27th Annual International Symposium on Microarchitecture, San Jose CA, 1994, pp. 12-21.

(56) References Cited

OTHER PUBLICATIONS

Fisher, "Trace Scheduling: A Technique for Global Microcode Compaction", IEEE Transactions on Computers, vol. C30, No. 7, Jul. 1981, pp. 478-490.
Chang et al., "Using Profile Information to Assist Classic Code Optimizations", Software Pract. Exper. Dec. 21, 1991, pp. 1301-1321.
Schmidt et al., "Profile-Directed Restructuring of Operating System Code", IBM Systems Journal, 1998, vol. 37, No. 2, pp. 270-297.
Aho et al., "Compilers: Principles, Techniques, and Tools", Addison-Wesley, 1988, pp. 488-497.
Intel, "Intel IA-64 Architecture Software Developer's Manual", Revision 1.1, vol. 4, No. 245320.002, Jul. 2001.
"CPU Cache", Wikipedia, pp. 1-14 retrieved Nov. 1, 2006 http://en.wikip;edia.org/wiki/CPU_cache.
Ammons et al., "Exploiting Hardware Performance Counters with Flow and Context Sensitive Profiling", 1997, ACM, pp. 85-96.
"Method for the dynamic prediction of nonsequential memory accesses", Sep. 25, 2002, pp. 1-4, ip.com IPCOM000009888D.
"Cache Miss Director—A Means of Prefetching Cache Missed Lines", Aug. 1, 1982, IBM Technical Disclosure Bulletin, vol. 25, Issue 3A, pp. 1286.
Kikuchi, "Parallelization Assist System", Joho Shori, vol. 34, No. 9, Sep. 1993, pp. 1158-1169.
Cohen et al., "Hardware-Assisted Characterization of NAS Benchmarks", Cluster Computing, vol. 4, No. 3, Jul. 2001, pp. 189-196.
Talla et al., "Evaluating Signal Processing and Multimedia Applications on SIMD, VLIW and Super Scalar Architectures", International Conference on Computer Design, Austin, Sep. 17-20, 2000, pp. 163-172.
Iwasawa et al., "Parallelization Method of Fortran DO Loops by Parallelizing Assist System", Transactions of Information Processings Society of Japan, vol. 36, No. 8, Aug. 1995, pp. 1995-2006.
Talla et al., "Execution Characteristics of Multimedia Applications on a Pentium II Processor", IEEE International Performance, Computing, and Communications Conference, 19th, Phoenix, Feb. 20-22, 2000, pp. 516-524.
IBM Research Disclosure Bulletin 444188, "Enable Debuggers as an Object Performance Measurement Tool for Software Development Cost Reduction", Apr. 2001, pp. 686-688.
Jeong et al., "Cost Sensitive Cache Replacement Algorithms", Jun. 2002, Second Workshop on Cashing, Coherence and Consistency, NY, pp. 1-14.
Wikipedia "JavaServer Pages" downloaded Jan. 24, 2006 http://en.wikipedia.org/wiki/JavaServer_Pages.
"Hardware Cycle Based memory Residency", IBM, May 22, 2003, ip.com, IPCOM000012728D, pp. 1-2.
Hyde, "The Art of Assembly Language", 2001, Linux Edition, pp. 247-248, retrieved Mar. 1, 2005 from http://webster.cs.ucr.edu/AoA/Linux/PDFs/0_PDFIndexLinux.html.
Tanenbaum, "Structured Computer Organization", 1984, Prentice-Hall, Inc., 2nd Edition, pp. 10-12.
Torrellas et al., "False Sharing and Spatial Locality in Multiprocessor Caches", Jun. 1994, IEEE Transactions on Computers, vol. 43, No. 6, pp. 651-663.
Rothman et al., "Analysis of Shared Memory Misses and Reference Patterns", 2000, IEEE, pp. 187-198.
Short, "Embedded Microprocessor Systems Design: An Introduction Using the Intel 80C188EB" Prentice-Hall, Inc.: 1998, p. 761.
Mano, "Computer System Architecture", Prentice-Hall, Inc., $2^{nd}$ Ed., 1982, pp. 434-443.
Inoue, "Digital mobile communication system designed for nationwide police activities—WIDE system", IEEEXplore, Oct. 1996, pp. 1-2.
Merten et al., "A Hardware Driven Profiling Scheme for Identifying Program Hot Spots to Support Runtime Optimization", IEEE, 1999, pp. 136-147.
Taiwan Search Report for application 094100082 dated Apr. 19, 2010.
Jya, "Software Design of a UNIX-like Kernel", Jul. 2003, pp. 1-4 http://etd.lib.nsysu.edu.tw/ETD-search-c/view_etd?URN+etd-09151030113427.
USPTO Office Action dated Aug. 24, 2007 regarding U.S. Appl. No. 10/757,171, 30 pages.
USPTO Notice of Allowance dated Jan. 14, 2008 regarding U.S. Appl. No. 10/757,171, 7 pages.
USPTO Final Office Action dated Mar. 12, 2007 regarding U.S. Appl. No. 10/757,186, 28 pages.
USPTO Final Office Action dated Nov. 29, 2007 regarding U.S. Appl. No. 10/757,186, 30 pages.
USPTO Notice of Allowance dated Oct. 20, 2010 regarding U.S. Appl. No. 10/757,186, 8 pages.
USPTO Office Action dated Aug. 1, 2007 regarding U.S. Appl. No. 10/757,186, 34 pages.
USPTO Office Action dated Nov. 28, 2005 regarding U.S. Appl. No. 10/757,186, 17 pages.
USPTO Final Office Action dated Jun. 16, 2006 regarding U.S. Appl. No. 10/757,192, 11 pages.
USPTO Notice of Allowance dated Nov. 3, 2006 regarding U.S. Appl. No. 10/757,192, 15 pages.
USPTO Office Action dated Dec. 8, 2005 regarding U.S. Appl. No. 10/757,192, 12 pages.
USPTO Final Office Action dated Jan. 30, 2008 regarding U.S. Appl. No. 10/757,197, 11 pages.
USPTO Final Office Action dated Mar. 2, 2007 regarding U.S. Appl. No. 10/757,197, 19 pages.
USPTO Notice of Allowance dated Oct. 15, 2008 regarding U.S. Appl. No. 10/757,197, 6 pages.
USPTO Office Action dated Aug. 17, 2007 regarding U.S. Appl. No. 10/757,197, 17 pages.
USPTO Office Action dated Sep. 13, 2006 regarding U.S. Appl. No. 10/757,197, 22 pages.
USPTO Office Action dated Mar. 14, 2006 regarding U.S. Appl. No. 10/757,198, 7 pages.
USPTO Office Action dated Dec. 2, 2005 regarding U.S. Appl. No. 10/757,198, 13 pages.
USPTO Notice of Allowance dated Jul. 28, 2006 regarding U.S. Appl. No. 10/757,227, 11 pages.
USPTO Supplemental Notice of Allowance dated Aug. 10, 2006 regarding U.S. Appl. No. 10/757,227, 4 pages.
USPTO Office Action dated Feb. 28, 2006 regarding U.S. Appl. No. 10/757,227, 13 pages.
USPTO Final Office Action dated May 8, 2006 regarding U.S. Appl. No. 10/687,248, 23 pages.
USPTO Office Action dated Jan. 6, 2006 regarding U.S. Appl. No. 10/687,248, 24 pages.
USPTO Final Office Action dated Jul. 5, 2007 regarding U.S. Appl. No. 10/757,250, 11 pages.
USPTO Notice of Allowance dated Nov. 20, 2007 regarding U.S. Appl. No. 10/757,250, 6 pages.
USPTO Office Action dated Oct. 6, 2006 regarding U.S. Appl. No. 10/757,250, 10 pages.
USPTO Notice of Allowance dated Dec. 27, 2011 regarding U.S. Appl. No. 12/185,254, 10 pages.
USPTO Notice of Allowance dated Jul. 1, 2009 regarding U.S. Appl. No. 12/431,389, 31 pages.
USPTO Notice of Allowance dated Apr. 30, 2008 regarding U.S. Appl. No. 10/757,250, 6 pages.
USPTO Office Action dated Feb. 26, 2007 regarding U.S. Appl. No. 10/682,437, 18 pages.
USPTO Office Action dated Jun. 15, 2011 regarding U.S. Appl. No. 12/122,558, 18 pages.
USPTO Notice of Allowance dated Nov. 22, 2011 regarding U.S. Appl. No. 12/122,558, 13 pages.
USPTO Final Office Action dated Oct. 24, 2006 regarding U.S. Appl. No. 10/806,576, 25 pages.
USPTO Office Action dated May 4, 2006 regarding U.S. Appl. No. 10/806,576, 16 pages.
USPTO Final Office Action dated May 9, 2006 regarding U.S. Appl. No. 10/674,604, 21 pages.
USPTO Office Action dated Jan. 17, 2006 regarding U.S. Appl. No. 10/674,604, 22 pages.

(56) References Cited

OTHER PUBLICATIONS

USPTO Final Office Action dated Jun. 23, 2006 regarding U.S. Appl. No. 10/674,606, 17 pages.
USPTO Office Action dated Jan. 12, 2006 regarding U.S. Appl. No. 10/674,606, 12 pages.
USPTO Final Office Action dated Dec. 20, 2006 regarding U.S. Appl. No. 10/806,633, 21 pages.
USPTO Notice of Allowance dated Apr. 20, 2007 regarding U.S. Appl. No. 10/806,633, 4 pages.
USPTO Supplemental Notice of Allowance dated Oct. 5, 2007 regarding U.S. Appl. No. 10/806,633, 7 pages.
USPTO Office Action dated May 15, 2006 regarding U.S. Appl. No. 10/806,633, 19 pages.
USPTO Final Office Action dated Aug. 23, 2007 regarding U.S. Appl. No. 10/674,642, 15 pages.
USPTO Office Action dated Feb. 27, 2007 regarding U.S. Appl. No. 10/674,642, 16 pages.
USPTO Office Action dated Mar. 27, 2008 regarding U.S. Appl. No. 10/674,642, 16 pages.
USPTO Office Action dated Aug. 24, 2006 regarding U.S. Appl. No. 10/674,642, 24 pages.
USPTO Notice of Allowance dated Mar. 18, 2011 regarding U.S. Appl. No. 10/803,663, 10 pages.
USPTO Office Action dated May 2, 2008 regarding U.S. Appl. No. 10/803,663, 23 pages.
USPTO Office Action dated May 4, 2007 regarding U.S. Appl. No. 10/803,663, 36 pages.
USPTO Office Action dated Oct. 18, 2007 regarding U.S. Appl. No. 10/803,663, 24 pages.
USPTO Final Office Action dated Apr. 29, 2008 regarding U.S. Appl. No. 10/808,716, 10 pages.
USPTO Final Office Action dated Jul. 24, 2007 regarding U.S. Appl. No. 10/808,716, 19 pages.
USPTO Final Office Action dated Nov. 16, 2007 regarding U.S. Appl. No. 10/808,716, 10 pages.
USPTO Notice of Allowance dated Sep. 12, 2008 regarding U.S. Appl. No. 10/808,716, 19 pages.
USPTO Office Action dated Feb. 8, 2007 regarding U.S. Appl. No. 10/808,716, 37 pages.
USPTO Final Office Action dated Sep. 25, 2007 regarding U.S. Appl. No. 10/675,721, 16 pages.
USPTO Final Office Action dated Oct. 3, 2008 regarding U.S. Appl. No. 10/675,721, 8 pages.
USPTO Office Action dated Feb. 26, 2007 regarding U.S. Appl. No. 10/675,721, 40 pages.
USPTO Office Action dated Apr. 9, 2008 regarding U.S. Appl. No. 10/675,721, 8 pages.
USPTO Final Office Action dated May 31, 2006 regarding U.S. Appl. No. 10/675,751, 15 pages.
USPTO Office Action dated Jan. 30, 2006 regarding U.S. Appl. No. 10/675,751, 17 pages.
USPTO Final Office Action dated Jun. 15, 2010 regarding U.S. Appl. No. 10/675,776, 9 pages.
USPTO Final Office Action dated Jun. 17, 2008 regarding U.S. Appl. No. 10/675,776, 17 pages.
USPTO Final Office Action dated Jun. 30, 2009 regarding U.S. Appl. No. 10/675,776, 22 pages.
USPTO Notice of Allowance dated Dec. 29, 2010 regarding U.S. Appl. No. 10/675,776, 10 pages.
USPTO Office Action dated Jan. 21, 2010 regarding U.S. Appl. No. 10/675,776, 13 pages.
USPTO Office Action dated Dec. 18, 2008 regarding U.S. Appl. No. 10/675,776, 22 pages.
USPTO Office Action dated Dec. 21, 2007 regarding U.S. Appl. No. 10/675,776, 17 pages.
USPTO Office Action dated Oct. 2, 2006 regarding U.S. Appl. No. 10/675,777, 25 pages.
USPTO Final Office Action dated May 31, 2006 regarding U.S. Appl. No. 10/675,778, 19 pages.
USPTO Office Action dated Feb. 3, 2006 regarding U.S. Appl. No. 10/675,778, 19 pages.
USPTO Final Office Action dated Oct. 26, 2007 regarding U.S. Appl. No. 10/675,783, 14 pages.
USPTO Final Office Action dated Oct. 30, 2008 regarding U.S. Appl. No. 10/675,783, 22 pages.
USPTO Office Action dated Apr. 17, 2008 regarding U.S. Appl. No. 10/675,783, 16 pages.
USPTO Office Action dated May 14, 2007 regarding U.S. Appl. No. 10/675,783, 42 pages.
USPTO Final Office Action dated Jun. 2, 2006 regarding U.S. Appl. No. 10/675,831, 18 pages.
USPTO Office Action dated Jan. 27, 2006 regarding U.S. Appl. No. 10/675,831, 17 pages.
USPTO Final Office Action dated Feb. 11, 2008 regarding U.S. Appl. No. 10/806,866, 17 pages.
USPTO Final Office Action dated Mar. 29, 2007 regarding U.S. Appl. No. 10/806,866, 22 pages.
USPTO Office Action dated Oct. 5, 2006 regarding U.S. Appl. No. 10/806,866, 32 pages.
USPTO Office Action dated Jun. 25, 2008 regarding U.S. Appl. No. 10/806,866, 6 pages.
USPTO Office Action dated Aug. 24, 2007 regarding U.S. Appl. No. 10/806,866, 23 pages.
USPTO Notice of Allowance dated Dec. 16, 2008 regarding U.S. Appl. No. 10/806,866, 8 pages.
USPTO Examiner's Answer to Appeal Brief dated Oct. 31, 2008 regarding U.S. Appl. No. 10/806,871, 21 pages.
USPTO Final Office Action dated Mar. 22, 2007 regarding U.S. Appl. No. 10/806,871, 23 pages.
USPTO Final Office Action dated Apr. 9, 2008 regarding U.S. Appl. No. 10/806,871, 20 pages.
USPTO Office Action dated Aug. 24, 2007 regarding U.S. Appl. No. 10/806,871, 26 pages.
USPTO Office Action dated Sep. 19, 2006 regarding U.S. Appl. No. 10/806,871, 35 pages.
USPTO Notice of Allowance dated Sep. 7, 2011 regarding U.S. Appl. No. 10/806,871, 9 pages.
USPTO Final Office Action dated Nov. 3, 2006 regarding U.S. Appl. No. 10/675,872, 19 pages.
USPTO Notice of Allowance dated Jan. 2, 2008 regarding U.S. Appl. No. 10/675,872, 6 pages.
USPTO Supplemental Notice of Allowance dated Mar. 19, 2008 regarding U.S. Appl. No. 10/675,872, 6 pages.
USPTO Office Action dated Jun. 5, 2006 regarding U.S. Appl. No. 10/675,872, 16 pages.
USPTO Office Action dated Jul. 13, 2007 regarding U.S. Appl. No. 10/675,872, 22 pages.
USPTO Final Office Action dated Oct. 4, 2007 regarding U.S. Appl. No. 10/806,917, 18 pages.
USPTO Notice of Allowance dated May 1, 2008 regarding U.S. Appl. No. 10/806,917, 9 pages.
USPTO Office Action dated Apr. 20, 2007 regarding U.S. Appl. No. 10/806,917, 45 pages.
USPTO notice of allowance dated Oct. 2, 2012 regarding U.S. Appl. No. 10/682,385, 30 Pages.
Briggs et al., "Synchronization, Coherence, and Event Ordering in Multiprocessors," Computer, vol. 21, Issue 2, Feb. 1988, pp. 9-21.
Cai, "Architectural and Multiprocessor Design Verification of the PowerPC 604 Data Cache," Conference Proceedings of the 1995 IEEE Fourteenth Annual International Phoenix Conference on Computers and Communications, Mar. 1995, pp. 383-388.
Carey et al., "The Architecture of the EXODUS Extensible DBMS", 1986 IEEE, ACM Digital Library, pp. 52-65.
Schulz, "EDG Testbed Experience," Oct. 2002, pp. 1-27, accessed Aug. 27, 2012 http://conferences.fnal.gov/lccws/papers2/tue/edgtestbmarkusfinal.pdf.
Grunwald et al., "Whole-Program Optimization for Time and Space Efficient Threads", ASPLOS-VII Proceedings—Seventh International Conference on Architectural Support for Programming Languages and Operating Systems, Oct. 1996, 10 pages.

(56) References Cited

OTHER PUBLICATIONS

Rothman et al., "Anaylsis of Shared Memory Misses and Reference Patterns," Proceedings of the 2000 International Conference on Computer Design, Feb. 2000, pp. 187-198.
Kistler et al., "Continuous Program Optimization: A Case Study," ACM Transactions on Programming Languages and Systems, vol. 25, No. 4, Jul. 2003, pp. 500-548.
USPTO Final Office Action dated Aug. 15, 2007 regarding U.S. Appl. No. 10/682,437, 15 pages.
Santhanam et al., "Software Verification Tools Assessment Study", Department of Transportation: Federal Aviation Administration Technical Report, Report No. DOT/FAA/AR-06/54, Jun. 2007, 139 pages.
TW search report dated Jun. 30, 2010 regarding Taiwan application 094107739A, filed Mar. 14, 2005, 2 Pages.
Shye et al., "Code Coverage Testing Using Hardware Performance Monitoring Support", Proceedings of the Sixth International Symposium on Automated Analysis-Driven Debugging, Sep. 2005, 5 pages.
Soffa et al., "Exploiting Hardware Advances for Software Testing and Debugging (NIER Track)", Proceedings of the 33rd International Conference on Software Engineering, May 2011, 4 pages.
Stolicny et al., "Alpha 21164 Manufacturing Test Development and Coverage Analysis," IEEE Design & Test of Computers, vol. 15, Issue 3, Jul./Sep. 1988, pp. 98-104.
"Interrupt," Wikipedia definition, article undated, last modified Aug. 8, 2012, 7 pages, accessed Aug. 27, 2012 http://en.wikipedia.org/wiki/Interrupt.
USPTO supplemental notice of allowance dated May 8, 2008 regarding U.S. Appl. No. 10/675,777, 4 Pages.
USPTO supplemental notice of allowance dated Jan. 9, 2008 regarding U.S. Appl. No. 10/675,777, 2 Pages.
USPTO non-final office action dated Sep. 2, 2011 regarding U.S. Appl. No. 12/185,254, 21 Pages.
USPTO non-final office action dated Apr. 13, 2012 regarding U.S. Appl. No. 12/021,425, 30 Pages.
USPTO final office action dated Mar. 21, 2007 regarding U.S. Appl. No. 10/675,777, 20 Pages.
USPTO notice of allowance dated Sep. 25, 2007 regarding U.S. Appl. No. 10/675,777, 16 Pages.
USPTO non-final office action dated Oct. 2, 2006 regarding U.S. Appl. No. 10/675,777, 25 Pages.
USPTO notice of allowance dated May 1, 2008 regarding U.S. Appl. No. 10/806,917, 11 Pages.
Armand et al., "Multi-threaded Processes in Chorus/MIX," Proceedings of EEUG Spring 1990 Conference, Apr. 1990, pp. 1-16.
Saltz et al., "Run-Time Scheduling and Execution of Loops on Message Passing Machines," Journal of Parallel and Distributed Computing, vol. 8, Issue 4, April 990, pp. 303-312.
"Tool to Facilitate Testing of Software to Insur Compatibility," IBM Technical Disclosure Bulletin, vol. 30, Issue 11, Apr. 1988, pp. 162-165.
Tran et al., "Student Paper: A hardware-Assisted Tool for Fast, Full Code Coverage Analysis," 19th International Symposium on Software Reliability Engineering, Nov. 2008, pp. 321-322.
Zhou, "Using Coverage Information to Guide Test Case Selection in Adaptive Random Testing," 2010 IEEE 34th Annual Computer Software and Applications Conference Workshops, Jul. 2010, pp. 208-213.
USPTO notice of allowance dated Sep. 4, 2012 regarding U.S. Appl. No. 12/021,425, 5 Pages.
USPTO non-final office action dated Jun. 17, 2013 regarding U.S. Appl. No. 12/021,425, 46 Pages.
Non-final office action dated Sep. 20, 2013 regarding U.S. Appl. No. 13/347,876, 89 pages.

* cited by examiner

QUALIFYING COLLECTION OF PERFORMANCE MONITORING EVENTS BY TYPES OF INTERRUPT WHEN INTERRUPT OCCURS

CROSS REFERENCE TO RELATED APPLICATIONS

The present invention is a divisional of U.S. Ser. No. 10/757,186, filed on Jan. 14, 2004, status allowed.

The present invention is related to the following applications entitled "Method and Apparatus for Counting Instruction Execution and Data Accesses", Ser. No. 10/675,777, filed on Sep. 30, 2003; "Method and Apparatus for Selectively Counting Instructions and Data Accesses", Ser. No. 10/674,604, filed on Sep. 30, 2003; "Method and Apparatus for Generating Interrupts Upon Execution of Marked Instructions and Upon Access to Marked Memory Locations", Ser. No. 10/675,831, filed on Sep. 30, 2003; "Method and Apparatus for Counting Data Accesses and Instruction Executions that Exceed a Threshold", Ser. No. 10/675,778, filed on Sep. 30, 2003; "Method and Apparatus for Counting Execution of Specific Instructions and Accesses to Specific Data Locations", Ser. No. 10/675,776, filed on Sep. 30, 2003; "Method and Apparatus for Debug Support for Individual Instructions and Memory Locations", Ser. No. 10/675,751, filed on Sep. 30, 2003; "Method and Apparatus to Autonomically Select Instructions for Selective Counting", Ser. No. 10/675,721, filed on Sep. 30, 2003; "Method and Apparatus to Autonomically Count Instruction Execution for Applications", Ser. No. 10/674,642, filed on Sep. 30, 2003; "Method and Apparatus to Autonomically Take an Exception on Specified Instructions", Ser. No. 10/674,606, filed on Sep. 30, 2003; "Method and Apparatus to Autonomically Profile Applications", Ser. No. 10/675,783, filed on Sep. 30, 2003; "Method and Apparatus for Counting Instruction and Memory Location Ranges", Ser. No. 10/675,872, filed on Sep. 30, 2003; "Method and Apparatus for Counting Interrupts by Type", Ser. No. 10/757,198, filed on Jan. 14, 2004, and "Method and Apparatus for Providing Pre and Post Handlers for Recording Events", Ser. No. 10/757,192, filed on Jan. 14, 2004. All of the above related applications are assigned to the same assignee, and incorporated herein by reference.

BACKGROUND

1. Field

The present invention relates generally to an improved data processing system and, in particular, to a method and system for monitoring performance of the processor in a data processing system when an interrupt occurs. Still more particularly, the present invention relates to a method, apparatus, and computer instructions for qualifying collection of performance monitoring events by types of interrupt when interrupt occurs.

2. Description of the Related Art

A typical data processing system utilizes processors to execute a set of instructions in order to perform a certain task, such as reading a specific character from the main memory. However, as the number of tasks required to be executed by the processor increases, the efficiency of the processor's access patterns to memory and the characteristics of such access become important factors for engineers who want to optimize the system.

Currently, the prior art contains mechanisms that can count occurrences of software-selectable events, such as cache misses, instructions executed, I/O data transfer requests, and the time a given process may take to execute within a data processing system. One such mechanism is a performance monitor. A performance monitor performs monitoring on selected characteristics to assist analysis of a system by determining a machine's state at a particular time. This analysis provides information of how the processor is used when instructions are executed and its interaction with the main memory when data are stored. In addition, the performance monitor may provide the amount of time that has passed between events in a processing system. The performance monitor provides counts of events that may be used by engineers to analyze system performance. This analysis may cause application code changes such as possible relocation of branch instructions and memory accesses to further optimize the performance of a system. Moreover, data may be gathered by the performance monitor on how the processor accesses the data processing system's level 1 and level 2 cache, and main memory in order to identify performance bottlenecks that are specific to a hardware or software environment.

The performance monitor described above does not provide the ability to further qualify the events that occur for a particular type of interrupt. An interrupt occurs, for example, when a device, such as a mouse or keyboard, raises an interrupt signal to notify the processor that an event has occurred. When the processor accepts an interrupt request, the processor completes its current instruction and passes the control to an interrupt handler. The interrupt handler executes an interrupt service routine that is associated with the interrupt. An interrupt may also be caused by a specific machine language operation code, for example Motorola 68000's TRAP, a product from Motorola. In this case, an unexpected software condition such as divide by zero causes the processor to store the current state, store identifying information about the particular interrupt and pass control to an interrupt handler that handles this unexpected software condition.

It would be advantageous to have an improved method, apparatus, and computer instructions for qualifying counting of events that occur while servicing interrupt requests based on the type of interrupt that has occurred.

SUMMARY

The present invention provides a method, apparatus and computer instructions for monitoring performance of a data processing system by qualifying events by type of interrupt when an interrupt occurs in the processor of the data processing system. The performance monitoring unit of the present invention is programmed to count events that are qualified based on the type of interrupt that has occurred. When the performance monitoring unit detects a particular type of the interrupt, the performance monitoring unit collects events that occur for that interrupt type. The resulting event information is later presented to the user for performance analysis.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

A preferred embodiment of the present invention monitors performance of data processing system while executing a program on the data processing system. In one embodiment, a performance monitoring unit is programmed to count events (such as cache misses, clock cycles, or other events that occur during the execution and processing of an interrupt) and to qualify those counted events by the type of interrupt during which they occur, and (in some embodiments) the state of the interrupt during which they occur. The information gathered in the innovative system and method can be presented to software or to a user for analysis.

Figure 1:
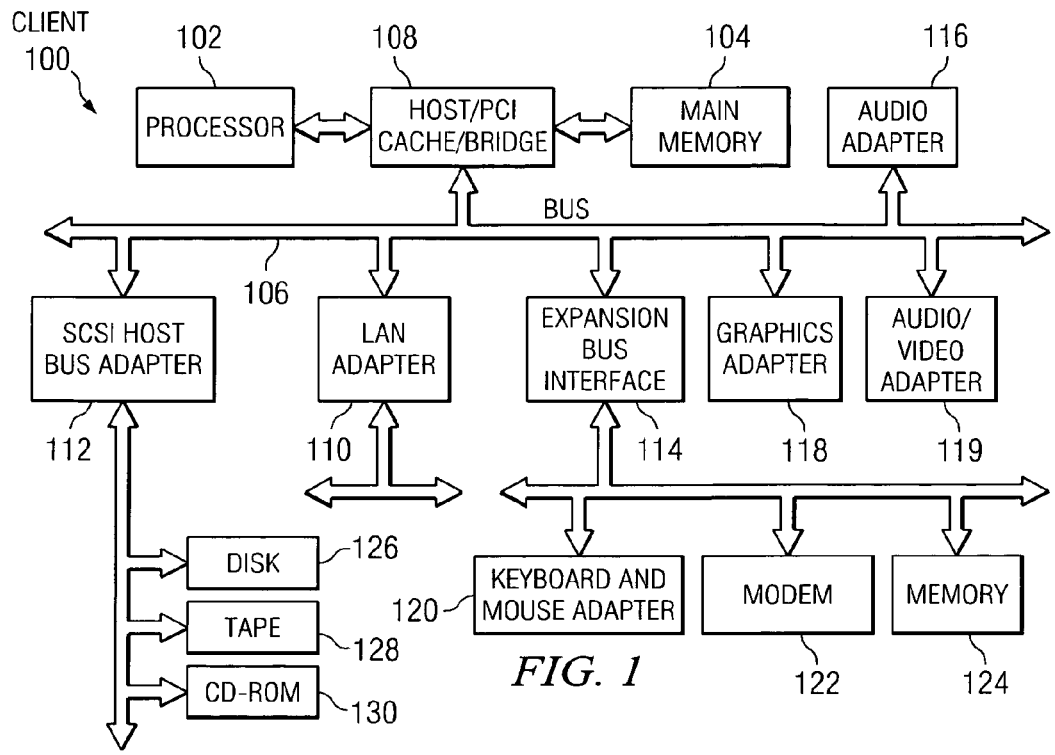
FIG. 1 is an exemplary block diagram of a data processing system in which the present invention may be implemented.

In a preferred embodiment, the present invention is implemented in a computer system. For example, the computer system can be a client or a server in a client-server environment of a network. With reference now to FIG. 1, an exemplary block diagram of a data processing system is shown in which the present invention may be implemented. Client 100 is an example of a computer, in which code or instructions implementing the processes of the present invention may be located. Client 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows XP, which is available from Microsoft Corporation. An object oriented programming system such as Java may run in conjunction with the operating system and provides calls to the operating system from Java programs or applications executing on client 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, client 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, client 100 may be a stand-alone system configured to be bootable without relying on some type of network communication interface, whether or not client 100 comprises some type of network communication interface. As a further example, client 100 may be a personal digital assistant (PDA), which is configured with ROM and/or flash ROM to provide non-volatile memory for storing operating system files and/or user-generated data. The depicted example in FIG. 1 and above-described examples are not meant to imply architectural limitations.

The processes of the present invention are performed by processor 102 using computer implemented instructions, which may be located in a memory such as, for example, main memory 104, memory 124, or in one or more peripheral devices 126-130.

Figure 2:
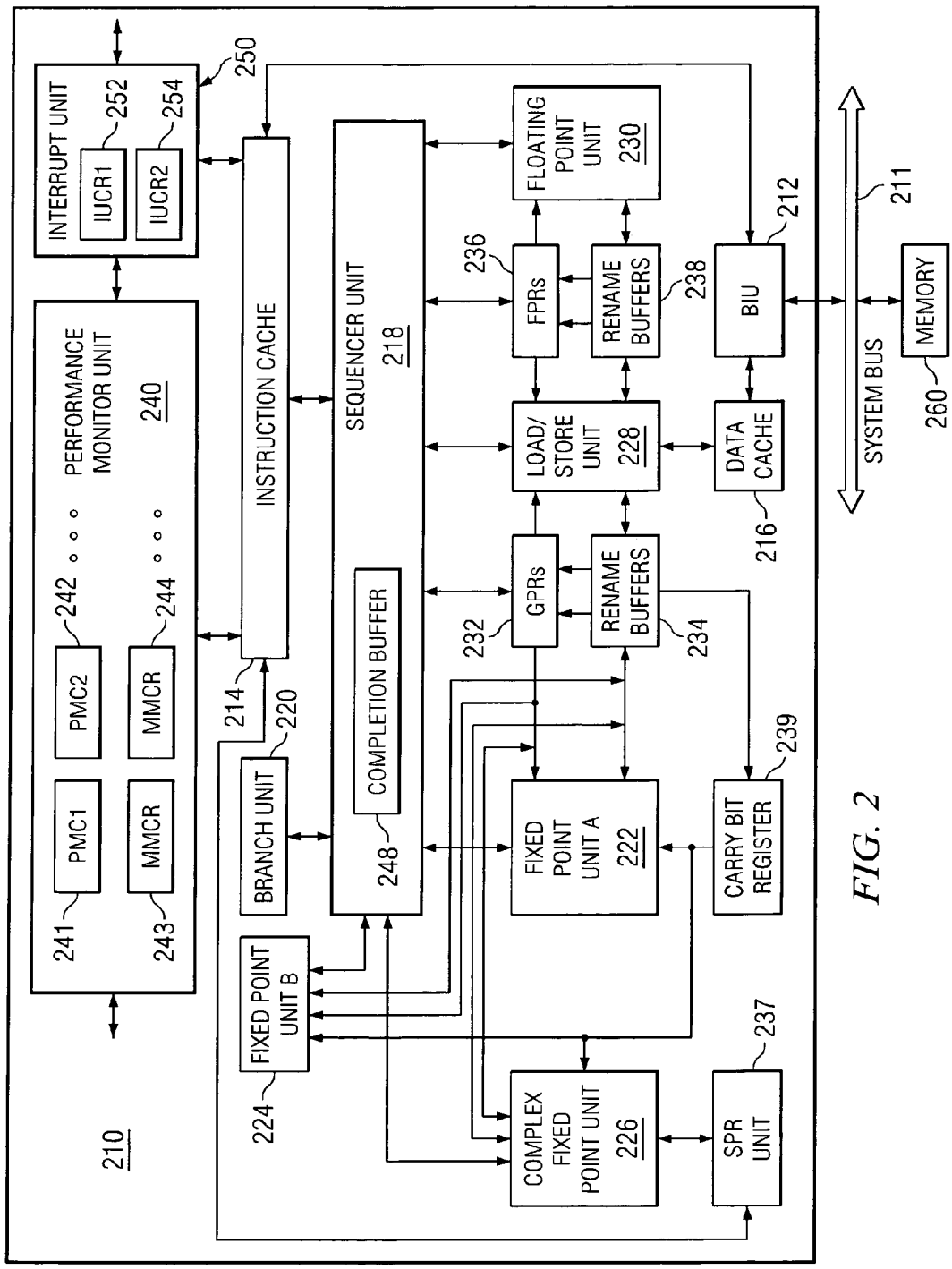
FIG. 2 is an exemplary block diagram of a processor system for processing information according to a preferred embodiment of the present invention.

Turning next to FIG. 2, an exemplary block diagram of a processor system for processing information is depicted in accordance with a preferred embodiment of the present invention. Processor 210 may be implemented as processor 102 in FIG. 1.

In a preferred embodiment, processor 210 is a single integrated circuit superscalar microprocessor. Accordingly, as discussed further herein below, processor 210 includes various units, registers, buffers, memories, and other sections, all of which are formed by integrated circuitry. Also, in the preferred embodiment, processor 210 operates according to reduced instruction set computer ("RISC") techniques. As shown in FIG. 2, system bus 211 is connected to a bus interface unit ("BIU") 212 of processor 210. BIU 212 controls the transfer of information between processor 210 and system bus 211.

BIU 212 is connected to an instruction cache 214 and to data cache 216 of processor 210. Instruction cache 214 outputs instructions to sequencer unit 218. In response to such instructions from instruction cache 214, sequencer unit 218 selectively outputs instructions to other execution circuitry of processor 210.

In addition to sequencer unit 218, in the preferred embodiment, the execution circuitry of processor 210 includes multiple execution units, namely a branch unit 220, a fixed-point unit A ("FXUA") 222, a fixed-point unit B ("FXUB") 224, a complex fixed-point unit ("CFXU") 226, a load/store unit ("LSU") 228, and a floating-point unit ("FPU") 230. FXUA 222, FXUB 224, CFXU 226, and LSU 228 input their source operand information from general-purpose architectural registers ("GPRs") 232 and fixed-point rename buffers 234.

Moreover, FXUA 222 and FXUB 224 input a "carry bit" from a carry bit ("CA") register 239. FXUA 222, FXUB 224, CFXU 226, and LSU 228 output results (destination operand information) of their operations for storage at selected entries in fixed-point rename buffers 234. Also, CFXU 226 inputs and outputs source operand information and destination operand information to and from special-purpose register processing unit ("SPR unit") 237.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238.

In response to a Load instruction, LSU 228 inputs information from data cache 216 and copies such information to selected ones of rename buffers 234 and 238. If such information is not stored in data cache 216, then data cache 216 inputs (through BIU 212 and system bus 211) such information from a system memory 260 connected to system bus 211. Moreover, data cache 216 is able to output (through BIU 212 and system bus 211) information from data cache 216 to system memory 260 connected to system bus 211. In response to a Store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs (to sequencer unit 218) signals indicating suitable memory addresses storing a sequence of instructions for execution by processor 210. In response to such signals from branch unit 220, sequencer unit 218 inputs the indicated sequence of instructions from instruction cache 214. If one or more of the sequence of instructions is not stored in instruction cache 214, then instruction cache 214 inputs (through BIU 212 and system bus 211) such instructions from system memory 260 connected to system bus 211.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

As information is stored at a selected one of rename buffers 234, such information is associated with a storage location (e.g. one of GPRs 232 or carry bit (CA) register 242) as specified by the instruction for which the selected rename buffer is allocated. Information stored at a selected one of rename buffers 234 is copied to its associated one of GPRs 232 (or CA register 242) in response to signals from sequencer unit 218. Sequencer unit 218 directs such copying of information stored at a selected one of rename buffers 234 in response to "completing" the instruction that generated the information. Such copying is called "writeback."

As information is stored at a selected one of rename buffers 238, such information is associated with one of FPRs 236. Information stored at a selected one of rename buffers 238 is copied to its associated one of FPRs 236 in response to signals from sequencer unit 218. Sequencer unit 218 directs such copying of information stored at a selected one of rename buffers 238 in response to "completing" the instruction that generated the information.

Processor 210 achieves high performance by processing multiple instructions simultaneously at various ones of execution units 220, 222, 224, 226, 228, and 230. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 218 selectively inputs (from instruction cache 214) one or more instructions from one or more memory addresses storing the sequence of instructions discussed further hereinabove in connection with branch unit 220, and sequencer unit 218.

In the decode stage, sequencer unit 218 decodes up to four fetched instructions.

In the dispatch stage, sequencer unit 218 selectively dispatches up to four decoded instructions to selected (in response to the decoding in the decode stage) ones of execution units 220, 222, 224, 226, 228, and 230 after reserving rename buffer entries for the dispatched instructions' results (destination operand information). In the dispatch stage, operand information is supplied to the selected execution units for dispatched instructions. Processor 210 dispatches instructions in order of their programmed sequence.

In the execute stage, execution units execute their dispatched instructions and output results (destination operand information) of their operations for storage at selected entries in rename buffers 234 and rename buffers 238 as discussed further hereinabove. In this manner, processor 210 is able to execute instructions out-of-order relative to their programmed sequence.

In the completion stage, sequencer unit 218 indicates an instruction is "complete." Processor 210 "completes" instructions in order of their programmed sequence.

In the writeback stage, sequencer 218 directs the copying of information from rename buffers 234 and 238 to GPRs 232 and FPRs 236, respectively. Sequencer unit 218 directs such copying of information stored at a selected rename buffer. Likewise, in the writeback stage of a particular instruction, processor 210 updates its architectural states in response to the particular instruction. Processor 210 processes the respective "writeback" stages of instructions in order of their programmed sequence. Processor 210 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 226) may require more than one cycle. Accordingly, a variable delay may occur between a particular instruction's execution and completion stages in response to the variation in time required for completion of preceding instructions.

Completion buffer 248 is provided within sequencer 218 to track the completion of the multiple instructions which are being executed within the execution units. Upon an indication that an instruction or a group of instructions have been completed successfully, in an application specified sequential order, completion buffer 248 may be utilized to initiate the transfer of the results of those completed instructions to the associated general-purpose registers.

In addition, processor 210 also includes performance monitor unit 240, which is connected to instruction cache 214 as well as other units in processor 210. Operation of processor 210 can be monitored utilizing performance monitor unit 240, which in this illustrative embodiment is a software-accessible mechanism capable of providing detailed information descriptive of the utilization of instruction execution resources and storage control. Although not illustrated in FIG. 2, performance monitor unit 240 is coupled to each functional unit of processor 210 to permit the monitoring of all aspects of the operation of processor 210, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency. The events of interest also may include, for example, time for instruction decode, execution of instructions, branch events, cache misses, and cache hits.

Performance monitor unit 240 includes an implementation-dependent number (e.g., 2-8) of counters 241-242, labeled PMC1 and PMC2, which are utilized to count occurrences of selected events. Performance monitor unit 240 further includes at least one monitor mode control register (MMCR). In this example, two control registers, MMCRs 243 and 244 are present that specify the function of counters 241-242. Counters 241-242 and MMCRs 243-244 are preferably implemented as SPRs that are accessible for read or write via MFSPR (move from SPR) and MTSPR (move to SPR) instructions executable by CFXU 226. However, in one alternative embodiment, counters 241-242 and MMCRs 243-244 may be implemented simply as addresses in I/O space. In another alternative embodiment, the control registers and counters may be accessed indirectly via an index register. This embodiment is implemented in the IA-64 architecture in processors from Intel Corporation.

Additionally, processor 210 also includes interrupt unit 250, which is connected to instruction cache 214. Additionally, although not shown in FIG. 2, interrupt unit 250 is connected to other functional units within processor 210. Interrupt unit 250 may receive signals from other functional units and initiate an action, such as starting an error handling or trap process. In these examples, interrupt unit 250 is employed to generate interrupts and exceptions that may occur during execution of a program. In addition, for each performance monitoring counter such as PMC1 241, there is a corresponding interrupt unit control register (IUCR), such as IUCR2 252 that is accessible by the interrupt unit 250. In this example, IUCR1 252 corresponds to PMC1 241. IUCR2 252 corresponds to PMC2 242. IUCR1 252 and IUCR2 254 identify which interrupt generates a signal, so that PMC1 241 and PMC2 242 may count events associated with that interrupt.

The present invention provides a method, apparatus, and computer instructions for monitoring performance of a data processing system such as client 100 in FIG. 1 by qualifying events by type of interrupt when an interrupt occurs in the processor of the data processing system. The processor of the data processing system may be implemented as processor 210 in FIG. 2.

In a preferred embodiment, the present invention provides a performance monitoring unit (PMU), such as performance monitoring unit 240 in FIG. 2, that is programmable using counter control registers (CCR) such as MMCR 243 and MMCR 244 to count events that occur during execution of an interrupt. The counted events may be qualified by type of interrupt during which they occur. These events are currently known to the performance monitoring units, for example, instructions retired, TLB misses, level 2 cache misses, or clock cycles etc. In a preferred embodiment, the innovative performance monitor unit allows users to qualify events or conditions by interrupt type, preferably using hardware counters and registers of the performance monitoring unit. When an interrupt is signaled, the interrupt signal is used to identify whether the counting mechanism of the present invention is programmed to count events during that type of interrupt.

The counter control registers (CCR) in the performance monitoring unit may be extended to include an interrupt unit (IU) trace field, a interrupt unit (IU) state field, and a interrupt unit (IU) state mask field. The IU trace field allows user to control counting by enabling or disabling tracing. The IU state field represents the current state of interrupt processing, for example, interrupt on, interrupt taken, interrupt acknowledged and interrupt off. The IU state mask field indicates the state of interrupt processing during which tracing is to occur. These fields are used by the performance monitoring unit to count events that occur during the various states of the interrupt, and to parse the counting by state. The resulting data may be read by the user or a trace application, for example, from the performance monitoring unit for performance analysis at a later time in order to better optimize the system.

In addition, the performance monitoring unit may count multiple events at the same time by using multiple performance monitoring counters. The mechanism of the present invention allows the performance monitoring unit to program each counter to count a particular event. For example, counter 1 may be programmed to count cache misses for interrupt vector 1, counter 2 may be programmed to count cycles for interrupt vector 2 etc. Preferred embodiments of the present invention do not limit the qualifications for the counters. The counters may be programmed to count multiple events based on the hardware available to the user.

Furthermore, the performance monitoring unit supports counting of events for nested interrupts. Nested interrupts occur when an interrupt occurs while another interrupt is active. The performance monitoring unit of the present invention enables the performance monitoring counters to limit counting only to the on or off states of interrupt processing. This mechanism may be useful to engineers for investigating the efficiency of interrupt processing itself.

Figure 3:
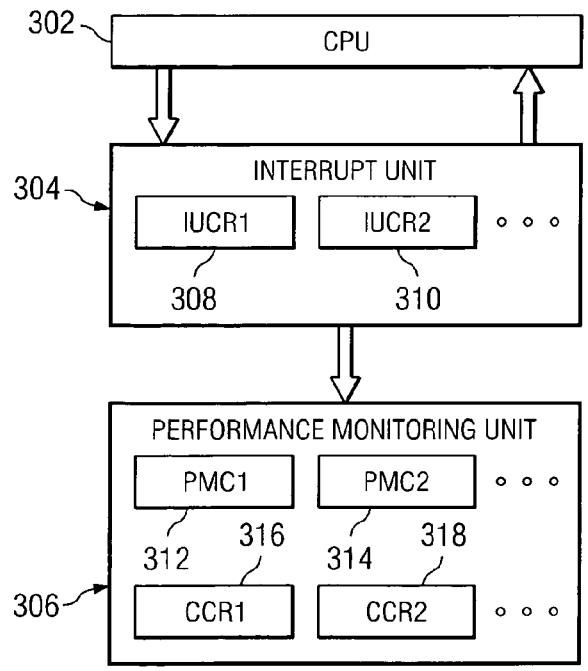
FIG. 3 is an exemplary diagram illustrating components for counting events by interrupt type when interrupt occurs in accordance with a preferred embodiment of the present invention.

Turning next to FIG. 3, an exemplary diagram illustrating components for counting events by interrupt type when an interrupt occurs is depicted in accordance with a preferred embodiment of the present invention. As depicted in FIG. 3, in a preferred embodiment, the central processing unit (CPU) 302 may be implemented as processor 210 in FIG. 2. When an interrupt occurs, the central processing unit (CPU) 302 sends a signal to interrupt unit 304 to request interrupt unit 304 generate an interrupt signal for a particular interrupt type.

Interrupt unit 304 may include a number of interrupt unit control registers (IUCRs) that are accessible to interrupt unit 304 based upon the number of performance monitoring counters in the performance monitoring unit 306. There is a one to one relationship between the IUCR and the performance monitoring counters. In this example, there are two IUCRs, IUCR1 308 that corresponds to performance monitoring counter PMC1 312 and IUCR2 310 that corresponds to performance monitoring counter PMC2 314. IUCR such as IUCR1 308 includes a type field that indicates which interrupt type is to generate a performance monitoring counter signal. The type field in the IUCR is later examined by interrupt unit 304 to see if it is an interrupt type of interest, i.e., whether events are to be counted during execution of the interrupt. If the interrupt type signal is an interrupt type of interest, interrupt unit 304 sends a Tracing On/Off signal to the performance monitoring unit 306 in order to enable or disable counting.

Also shown in FIG. 3, Performance monitoring unit 306 includes an implementation-dependent number of hardware counters such as hardware counters 312 and 314, also referred to herein as performance monitoring counters. PMC1 312 and PMC2 314 count events that occur during a particular state of interrupt processing. Performance monitoring unit 306 also includes a number of counter control registers (CCRs) such as CCR1 316 and CCR2 318, which may be implemented as MCCR1 233 and MCCR2 234 in FIG. 2. When CCR1 316 and CCR2 318 receive signals from interrupt unit 204 to enable or disable tracing events of an interrupt type and state changes during interrupt processing, CCR1 316 and CCR2 318 controls counting of the performance monitoring counters PMC1 312 and PMC2 314 by storing the current state of the interrupt and the state of the interrupt to trace, so that when tracing is enabled, performance monitoring counters PMC1 312 and PMC2 314 may count events of a particular interrupt state. The resulting trace data is then stored and may be collected at a later time from performance monitoring counters 312 and 314.

Figure 4:
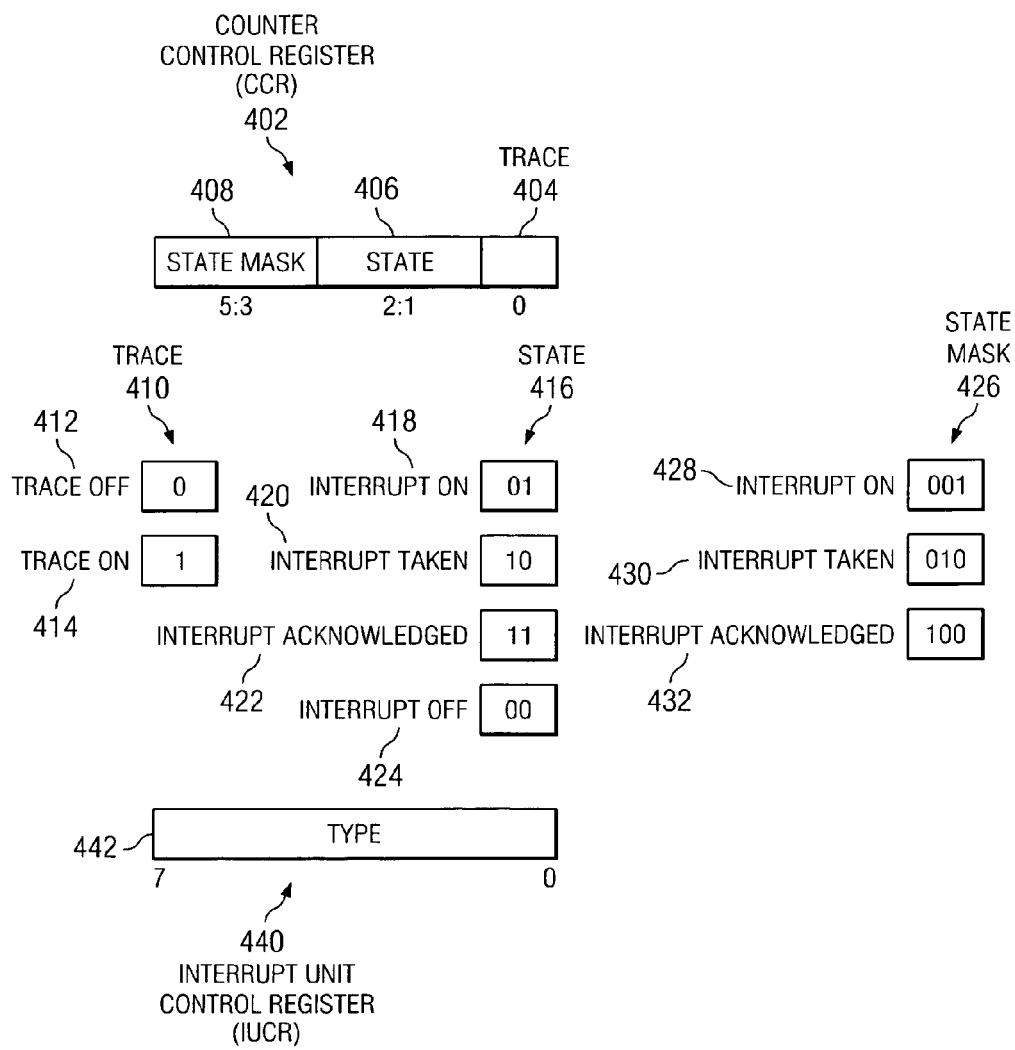
FIG. 4 is an exemplary diagram illustrating components of the performance monitoring unit and interrupt unit in accordance with a preferred embodiment of the present invention.

With reference to FIG. 4, an exemplary diagram illustrating components of the performance monitoring unit and interrupt unit is depicted in accordance with a preferred embodiment of the present invention. As depicted in FIG. 4, in a preferred embodiment, the performance monitoring unit may include a number of counter control registers (CCRs), which may be implemented as memory mode register (MMCR) such as MMCR1 233 and MMCR2 234 in FIG. 2. The counter control registers control functions of the performance monitoring counters. The counter control register 402 may include 3 fields: an interrupt unit (IU) trace field 404, an interrupt unit (IU) state field 406, and an interrupt unit (IU) state mask field 408. In this example, the IU trace field 402 is a one bit field, represented by bit 0; the IU state field 406 is a 2 bit field, represented by bit 1 and 2; and the IU state mask field 408 is a 3 bit field, represented by bit 3 to bit 5.

Also shown in FIG. 4, trace 410 is an example of the IU trace field 404. When the bit is 0, tracing by the performance monitoring counter is off or disabled. When bit is 1, tracing by the performance monitoring counter is on or enabled. Trace 410 is set by a Tracing On/Off signal that is raised by the interrupt unit once the interrupt unit examines the interrupt unit control register (IUCR) to determine whether interrupt type is of interest. For example, incoming interrupt signals can be compared to a stored set of interrupts that are designated for the counting process.

Next, an example IU state field 406 is represented by State 416. State 416 is read only by the performance monitoring unit and is used to store the current state of the interrupt. When the interrupt state is interrupt on 418, the bits in state 410 are set to 01. When the interrupt state is interrupt taken 420, the bits in state 410 are set to 10. When the interrupt state is interrupt acknowledged 422, the bits in state 410 are set to 11. When the interrupt state is interrupt off 424, the bits in state 410 are set to 00.

The last field in the counter control register is the IU state mask field 408. State mask 426 represents an example of IU state mask field 408. The IU state mask field 426 indicates during which state of the interrupt to count events. When the state during which to count is interrupt ON 428, state mask bits 426 are set to 001. When the state during which to count is interrupt taken 430, State mask 426 bits are set to 010. When the state during which to count is interrupt acknowledged, State mask bits 426 are set to 100.

Lastly, an interrupt unit control register (IUCR) 440 is shown in FIG. 4. IUCR may be accessible by the interrupt unit. IUCR 440 includes a type field 442 that has a size of a byte (8 bits). The type field 442 represents which interrupt type is to generate a Tracing On/Off signal to the performance monitoring unit.

Preferred embodiments of the present invention can be used to count events based on the type of interrupt during which they occur. Interrupt types are noted in an IUCR field, which indicates the types of interrupt during which monitoring of events is to occur. When an interrupt occurs, the interrupt type is compared to entries in the IUCR, and if the occurring interrupt matches an entry in the IUCR, events that occur during that interrupt are to be counted. A signal is sent to the PMU to turn on tracing, which causes the PMU to set the CCR to the state of the interrupt which is then occurring. As the interrupt goes through its states, the PMU continues to indicate what state the interrupt is in, so that events counted during the interrupt can be parsed by the interrupt state during which they occurred.

Figure 5:
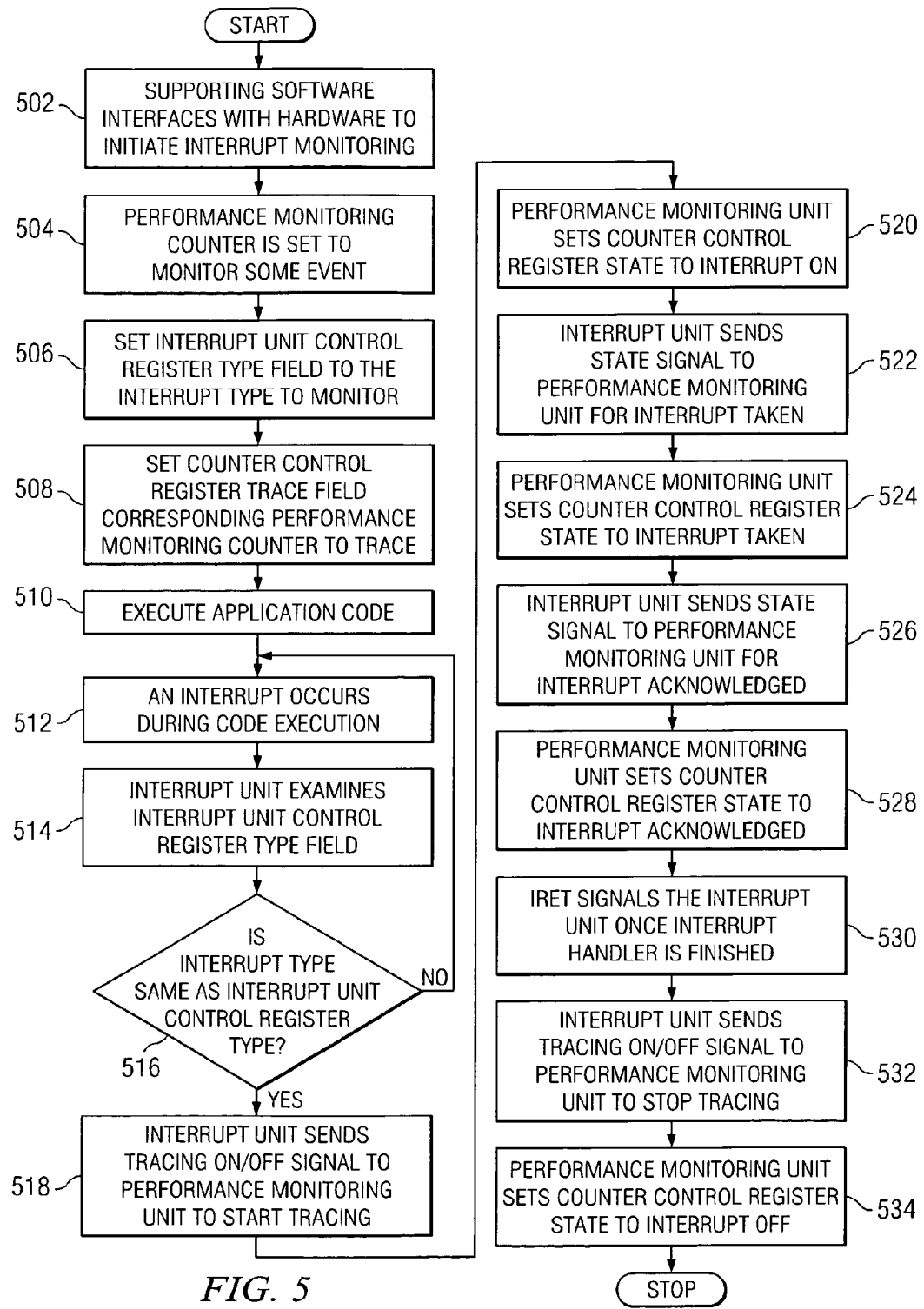
FIG. 5 is a flowchart outlining an exemplary process of qualify counting of events based on type of interrupt when interrupt occurs is depicted in accordance with a preferred embodiment of the present invention.

Turning to FIG. 5, a flowchart outlining an exemplary process of qualify counting of events based on type of interrupt when interrupt occurs is depicted in accordance with a preferred embodiment of the present invention. As depicted in FIG. 5, the process begins when supporting software (such as performance monitoring software) interfaces with the hardware to initiate interrupt monitoring (step 502). The performance monitoring counter is then set by supporting software to monitor some event (step 504), such as cache misses or clock cycles, for example. The supporting software also sets the interrupt unit control register (IUCR) type field to indicate which interrupt type is to be monitored (step 506), i.e., during which interrupt types events will be counted. Next, the supporting software sets the interrupt unit (IU) trace field of the counter control register (CCR) that corresponds to a performance monitoring counter used to count events (step 508). Step 508 enables tracing of events.

At some time after the IU trace field is set in step 508, application code is executed for an application that is to be monitored for performance (step 510). When an interrupt occurs during code execution (step 512), the interrupt unit examines the IUCR type field (step 514). A determination is made as to whether the interrupt is the same type as the IUCR type, which is an interrupt type of interest (step 516). If the interrupt type is not the same as the IUCR type, the process returns to step 512 to wait for the next interrupt to occur. If the interrupt type is the same as the IUCR type, the interrupt unit raises a Tracing On/Off signal and sends the signal to the performance monitoring unit (step 518) in order to start tracing events for the interrupt. Once the signal is received, the performance monitoring unit sets the counter control register's state field to interrupt on by setting the bits to 01 (step 520).

Next, the interrupt state changes to interrupt taken, the interrupt unit in turn raises a state change signal and sends the signal to the performance monitoring unit (step 522). Consequently, the performance monitoring unit sets the counter control register's state field to interrupt taken by setting the bits to 10 (step 524). Another interrupt state change causes the interrupt unit to raise a state change signal and sends the signal to the performance monitoring unit (step 526). Similarly, the performance monitoring unit sets the counter control register's state field to interrupt acknowledged by setting the bits to 11 (step 528). When the interrupt handler finishes executing the interrupt service routine, it signals the interrupt unit an IRET (interrupt return) (step 530). The interrupt unit raises a Tracing On/Off signal and sends the signal to the performance monitoring unit in order to stop tracing events for the interrupt (step 532). (Note that embodiments of the present invention can trace across one or a plurality of states of the interrupt, as described avoce.) Finally, the performance monitoring unit receives the signal and sets the counter control register state field to interrupt off by setting the bits to 00 (step 534). Thus, the process terminates thereafter.

Thus, the present invention provides a performance monitoring unit that allows the user to qualify events that occur by type of interrupt using one or more hardware counters. Hardware counters collect events that occur while servicing interrupt requests in order for a user to monitor performance of the system when a particular type of interrupt is being processed. Using a number of hardware counters of the present invention, a user may qualify different events for different interrupt type.

The performance monitoring unit also allows the user to qualify events that occur based upon the state of interrupt processing, so that a user may further collect events that occur during a particular interrupt state. Furthermore, the performance monitoring unit provides support for user to qualify events that occur when a nested interrupt occurs by using a counter that is associated with the nested interrupt. Moreover, the performance monitor unit may also count conditions such as clock cycles for a particular interrupt type at a particular interrupt state.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for qualifying events when an interrupt occurs, comprising:
    an interrupt unit including an interrupt unit control register for indicating an interrupt type selected to be monitored;
    the interrupt unit, responsive to an interrupt occurring during code execution, configured to determine whether the interrupt is of the interrupt type selected to be monitored as indicated by the interrupt unit control register;
    a performance monitoring unit including a counter control register for indicating a set of interrupt states selected to be monitored; and
    one or more hardware counters located within the performance monitoring unit; wherein the one or more hardware counters count events that occur during processing of the interrupt responsive to the interrupt unit determining that the interrupt is of the interrupt type selected to be monitored as indicated by the interrupt unit control register,
    wherein the one or more hardware counters count events that occur during the set of interrupt states selected to be monitored by the counter control registers.

2. The system of claim 1, wherein the set of interrupt states at least include interrupt on, interrupt taken, and interrupt acknowledged.

3. The system of claim 1, wherein the one or more hardware counters count multiple types of events that occur during the processing of the interrupt.

4. The system of claim 1, wherein the one or more hardware counters count events that occur during processing of the interrupt based on the interrupt type of the interrupt.

5. The system of claim 1, wherein the events include clock cycles and cache misses.

6. The system of claim 1, wherein the interrupt is a first interrupt, and further comprising a second interrupt that interrupts the first interrupt, wherein the one or more hardware counters separately count the events that occur during the processing of the first interrupt and events that occur during processing of the second interrupt.

7. A computer program product for qualifying events when an interrupt occurs, the computer program product comprising:
    instructions stored in a non-transitory computer readable medium in a coded format for execution by a processor of a data processing system when decoded, the instructions further comprising:
    first instructions, stored in the non-transitory computer readable medium that, when executed by the processor of the data processing system, cause the processor to receive a signal for invoking an interrupt, wherein the interrupt includes a plurality of interrupt states, wherein the plurality of interrupt states include interrupt on, interrupt taken and interrupt acknowledged;
    second instructions, stored in the non-transitory computer readable medium that, when executed by the processor, cause the processor responsive to an interrupt occurring during code execution to determine whether the interrupt is of the interrupt type selected to be monitored;
    third instructions, stored in the non-transitory computer readable medium that, when executed by the processor, to cause the processor to indicate in a counter control register of a performance monitoring unit a selected set of interrupt states to be monitored, wherein the set of interrupt states at least include interrupt on, interrupt taken, and interrupt acknowledged; and
    fourth instructions, stored in the non-transitory computer readable medium that, when executed by the processor, cause the processor to count at least one event for a selected plurality of interrupt states during processing of the interrupt.

8. The computer program product of claim 7, wherein the at least one event includes clock cycles and cache misses.

9. The computer program product of claim 7, wherein the second instructions comprise instructions for directing the processor to count multiple types of events for the selected plurality of interrupt states during the processing of the interrupt.

10. The computer program product of claim 7, wherein the counting is performed by one or more hardware counters during the processing of the interrupt.

11. The computer program product of claim 7, wherein the at least one event is counted based on an interrupt type of the interrupt during which the at least one event occurs.

12. The computer program product of claim 7, wherein the interrupt is a first interrupt, and further comprising a second interrupt that interrupts the first interrupt, and wherein hardware counters separately count the at least one event that occurs during the processing of the first interrupt and at least one event that occurs during processing of the second interrupt.

13. A computer implemented method for qualifying events when an interrupt occurs comprising instructions stored in a non-transitory computer readable medium wherein a processor of a data processing system executes the instructions to cause the processor of the data processing system to:

indicate in an interrupt unit control register on the processor of the data processing system a selected interrupt type to be monitored;

determine on the processor of the data processing system, responsive to an interrupt occurring during code execution, whether the interrupt is of the interrupt type selected to be monitored;

indicate in a counter control register of a performance monitoring unit of the data processing system a selected set of interrupt states to be monitored, wherein the set of interrupt states at least include interrupt on, interrupt taken, and interrupt acknowledged; and responsive to determining that the interrupt is of the interrupt type selected to be monitored, count, by one or more hardware counters located within the performance monitoring unit, events occurring during processing of the interrupt, wherein the one or more hardware counters count events that occur during the set of interrupt states selected to be monitored by the counter control register.

* * * * *